United States Patent
Lessard

(10) Patent No.: US 11,027,222 B2
(45) Date of Patent: Jun. 8, 2021

(54) APPARATUS AND METHOD FOR GRAVITATIONAL SEPARATION OF THE PHASES OF A TWO PHASE LIQUID

(71) Applicant: SUEZ GROUPE, Paris la Défense (FR)

(72) Inventor: Hugo Lessard, Lévis (CA)

(73) Assignee: SUEZ GROUPE, Paris la Défense (FR)

( * ) Notice: Subject to any disclaimer, the term of this patent is extended or adjusted under 35 U.S.C. 154(b) by 0 days.

(21) Appl. No.: 16/481,519

(22) PCT Filed: Jan. 26, 2018

(86) PCT No.: PCT/EP2018/052018
§ 371 (c)(1),
(2) Date: Jul. 29, 2019

(87) PCT Pub. No.: WO2018/141655
PCT Pub. Date: Aug. 9, 2018

(65) Prior Publication Data
US 2020/0001207 A1    Jan. 2, 2020

(30) Foreign Application Priority Data
Jan. 31, 2017    (CA) ..................................... 2956764

(51) Int. Cl.
*B01D 17/028*    (2006.01)
*B01D 17/12*    (2006.01)
(Continued)

(52) U.S. Cl.
CPC .......... *B01D 17/12* (2013.01); *B01D 17/0211* (2013.01); *B01D 17/0214* (2013.01);
(Continued)

(58) Field of Classification Search
CPC ............ B01D 17/0211; B01D 17/0214; B01D 17/12; B01D 21/0006; B01D 21/0042; B01D 21/2472
(Continued)

(56) References Cited

U.S. PATENT DOCUMENTS

| 1,940,794 | A | * | 12/1933 | Fisher | ................ | B01D 17/0211 210/522 |
| 2,307,154 | A | * | 1/1943 | Osuna | ................ | B01D 21/0045 210/521 |

(Continued)

FOREIGN PATENT DOCUMENTS

| FR | 2692161 | 12/1993 |
| WO | 9604058 | 2/1996 |

OTHER PUBLICATIONS

International Search Report and Written Opinion, International Patent Application No. PCT/EP2018/052018, dated Mar. 20, 2018.

*Primary Examiner* — Christopher Upton
(74) *Attorney, Agent, or Firm* — Saul Ewing Arnstein & Lehr LLP; Brian R. Landry

(57) ABSTRACT

Disclosed is an apparatus for the gravitational separation of the first and second liquid phases of a two phase liquid containing predominantly a continuous first liquid phase with a dispersed second liquid phase having a lower specific gravity than the first liquid. The apparatus comprises a tank defining an interior chamber. A feed inlet introduces the two phase liquid into the lower portion of the chamber. The upper portion of the chamber has an upward flow zone through which the two phase liquid rises, with the dispersed second liquid rising more than the first liquid and being separated therefrom due to the second liquid's lower specific gravity. The second liquid forms a floating layer and a
(Continued)

conduit directs separated second liquid from the floating layer to a second liquid outlet.

20 Claims, 3 Drawing Sheets

(51) Int. Cl.
    *B01D 17/02* (2006.01)
    *B01D 21/00* (2006.01)
    *B01D 21/24* (2006.01)

(52) U.S. Cl.
    CPC ..... *B01D 21/0006* (2013.01); *B01D 21/0042* (2013.01); *B01D 21/245* (2013.01)

(58) Field of Classification Search
    USPC ....... 210/744, 801, 802, 104, 521, 525, 533, 210/534, 540
    See application file for complete search history.

(56) References Cited

U.S. PATENT DOCUMENTS

| | | | | |
|---|---|---|---|---|
| 2,961,099 A * | 11/1960 | Lind | ................ | B01D 21/0042 210/525 |
| 3,623,608 A * | 11/1971 | Waterman | .......... | B01D 17/0205 210/525 |
| 4,024,881 A * | 5/1977 | Weiland | ............. | B01D 21/2472 210/523 |
| 4,802,978 A * | 2/1989 | Schmit | ............... | B01D 17/0214 210/104 |
| 5,536,409 A * | 7/1996 | Dunkers | ............ | B01D 21/0006 210/521 |
| 6,042,722 A | 3/2000 | Lenz | | |
| 7,988,864 B2 * | 8/2011 | Silva Valente | ..... | B01D 17/0217 210/801 |
| 9,499,416 B2 * | 11/2016 | Hardman | ........... | B01D 17/0211 |
| 2003/0116316 A1 | 6/2003 | Bouma | | |
| 2016/0121238 A1 * | 5/2016 | Mills | ..................... | B01D 17/12 210/744 |

* cited by examiner

APPARATUS AND METHOD FOR GRAVITATIONAL SEPARATION OF THE PHASES OF A TWO PHASE LIQUID

CROSS-REFERENCE TO RELATED APPLICATIONS

This application is a national phase application under 35 U.S.C. 371 of International Application No. PCT/EP2018/052018, filed Jan. 26, 2018, which claims priority to Canadian Patent Application No. 2956764, filed Jan. 31, 2017. The entire content of each application is hereby incorporated by reference herein.

INTRODUCTION

The present subject matter relates to gravitational separation of the phases of a two phase liquid.

It is well known to use gravity to separate the phases of a two phase liquid, provided that the two phases have a sufficient specific gravity differential. For example, waste water effluents from oil refineries and petro-chemical plants typically comprise predominantly a continuous water phase with a dispersed free-oil phase. They may also contain dispersed solids. Typically, the concentration of free-oil in such waste water effluents ranges from about 50 parts-per-million (ppm) to about 100 000 ppm.

Plant operators commonly use an oil/water separator based on the API/421 standard of the American Petroleum Institute. Such equipment has a number of disadvantages. First, the recovery of free oil is typically only about 90 to 95%. Secondly, the equipment includes a large tank that extends horizontally and occupies a large area. Third, moving mechanical components that are prone to wear and failure are used to skim off the free oil and often also to remove settled sludge.

SUMMARY

The following summary is intended to introduce the reader to the more detailed description that follows, and not to define or limit the claimed subject matter.

According to a first aspect, the present subject matter relates to an apparatus for the gravitational separation of the first and second liquid phases of a two phase liquid containing predominantly a continuous first liquid phase with a dispersed second liquid phase, the second liquid having a lower specific gravity than the first liquid. The apparatus comprises:
  a. an upright tank defining an interior chamber with an upper portion and a lower portion;
  b. a feed inlet by which the two phase liquid is introduced into the lower portion of the chamber;
  c. a first liquid outlet in the lower portion of the chamber by which separated first liquid is removed from the tank;
  d. a second liquid outlet in the upper portion of the chamber by which separated second liquid is removed from the tank;
  e. the upper portion of the chamber having an upward flow zone through which the two phase liquid from the feed inlet rises, with the dispersed second liquid rising more than the first liquid and being separated therefrom due to the second liquid's lower specific gravity, the second liquid forming a floating layer above the remaining liquid with an interface therebetween that is lower than the second liquid outlet;
  f. a conduit that can direct separated second liquid from the floating layer to the second liquid outlet, with a barrier that permits separated second liquid to flow into the conduit only when the top of the floating layer reaches a predetermined height;
  g. the upper portion of the chamber also having an array of baffles contiguous to the upward flow zone, the baffles defining channels through which separated first liquid descends, the channels being directed downwardly away from the upward flow zone;
  h. passages isolated from the chamber that communicate with the channels and carry separated first liquid to the first liquid outlet;
  i. a valve for controlling the flow of separated first liquid from the first liquid outlet;
  j. a sensor system for determining the height of the interface between the floating layer and the remaining liquid; and
  k. the valve being responsive to the sensor system to regulate the flow of separated first liquid from the first liquid outlet such that the height of the floating layer can be held generally constant.

In some examples, the two phase liquid also contains dispersed solids, and the apparatus further comprises a sludge outlet in the lower portion of the chamber by which sludge can be removed from the tank.

The apparatus may also comprise a nitrogen inlet and a nitrogen outlet by which a blanket of nitrogen may be maintained in the tank above the floating layer.

In some examples, the upper part of the tank is generally cylindrical and the lower portion of the tank is conical.

In some examples, the baffles are generally funnel-shaped. The upward flow zone may be in the center of the upper portion of the chamber and the baffles may be arranged in stacks around the upward flow zone. In some example, there may be six to eight stacks of generally funnel-shaped baffles.

The sensor system may include a guided-wave radar. The apparatus may also comprise a transmitter for transmitting control signal information from the sensor system to the valve.

The conduit may be generally ring-like trough having a sloped bottom to direct the second liquid to the second liquid outlet.

The feed inlet may direct the two phase liquid downwardly into the lower portion of the chamber.

The apparatus may also comprise an inlet by which nitrogen or steam may be injected to purge the baffles. The apparatus may also comprise an inlet by means of which steam or high pressure water can be injected to fluidize the sludge.

In some cases, the first liquid is substantially water and the second liquid is substantially oil. For example, the two phase liquid may be a waste water effluent. In particular, the two phase liquid may be a waste water effluent from an oil refinery, petro-chemical plant, chemical plant, or natural gas processing plant.

According to another aspect, the present subject matter relates to a method for the gravitational separation of the first and second liquid phases of a two phase liquid containing predominantly a continuous first liquid phase with a dispersed second liquid phase, the second liquid having a lower specific gravity than the first liquid. The method comprising the steps of:
  a. providing a tank defining an interior chamber with an upper portion and a lower portion;

b. introducing the two phase liquid into the lower portion of the chamber by a feed inlet;

c. directing the two phase liquid generally upwardly from the feed inlet through an upward flow zone in the upper portion of the chamber such that the second liquid rises more than the first liquid and separates therefrom due to the difference between their specific gravities, and forms a floating layer above the remaining liquid with an interface therebetween;

d. directing separated second liquid from the floating layer to a second liquid outlet that is located in the upper portion of the chamber below the interface between the floating layer and the remaining liquid via a conduit having a barrier that permits the second liquid to flow to the second liquid outlet only when the top of the floating layer reaches a predetermined height;

e. while concurrently directing separated first liquid downwardly through channels defined by an array of baffles contiguous to the upward flow zone, and further through passages isolated from the chamber that communicate with the channels and carry separated first liquid to a first liquid outlet located in the lower portion of the chamber;

f. and concurrently determining the height of the interface between the floating layer and the remaining liquid with a sensor system, the sensor system being active to control a valve that adjusts the flow of separated first liquid through the first liquid outlet such that the height of the floating layer can be held constant.

In some examples, the two phase liquid also contains dispersed solids, and the method further comprises the step of periodically removing accumulated sludge from a sludge outlet in the lower portion of the chamber.

The method may also further comprise maintaining a blanket of nitrogen in the tank above the floating layer.

In some examples, the separated first liquid is directed downwardly through channels defined by generally funnel-shaped baffles. The baffles may be arranged in stacks around the upward flow zone.

In some cases, the height of the interface between the floating layer and the remaining liquid is determined using a sensor system that includes a guided-wave radar.

The valve may be controlled with a transmitter for transmitting control signal information from the sensor system to the valve.

The separated second liquid may be directed from the floating layer to the second liquid outlet via a generally ring-like trough having a bottom sloped toward the second liquid outlet.

The two phase liquid may be introduced downwardly into the lower portion of the chamber. The method may also further comprise the step of periodically purging the baffles with injected nitrogen or steam. The method may also further comprise the step of periodically fluidizing and removing sludge with steam or high pressure water.

In some examples, the first liquid may be substantially water and the second liquid is substantially oil. For example, the two phase liquid may be a waste water effluent. In some examples, the two phase liquid is a waste water effluent from an oil refinery, petro-chemical plant, chemical plant, or natural gas processing plant.

The apparatus and method of the current subject matter can be used, for example, to separate the free oil and water phases of a waste water effluent from an oil refinery, petro-chemical plant, chemical plant, or natural gas processing plant. They may also be used to separate the phases of other two phase liquids, provided that the two phases have a sufficient differential between their specific gravities. In addition, for embodiments of the apparatus and method of the present subject matter that employ a guided wave radar to determine the location of the interface between the floating layer and the remaining liquid, the two phases must have a sufficient differential between their dielectric indices.

DRAWINGS

In order that the claimed subject matter may be more fully understood, reference will be made to the accompanying drawings, in which:

DESCRIPTION OF PARTICULAR EMBODIMENTS

Figure 1:
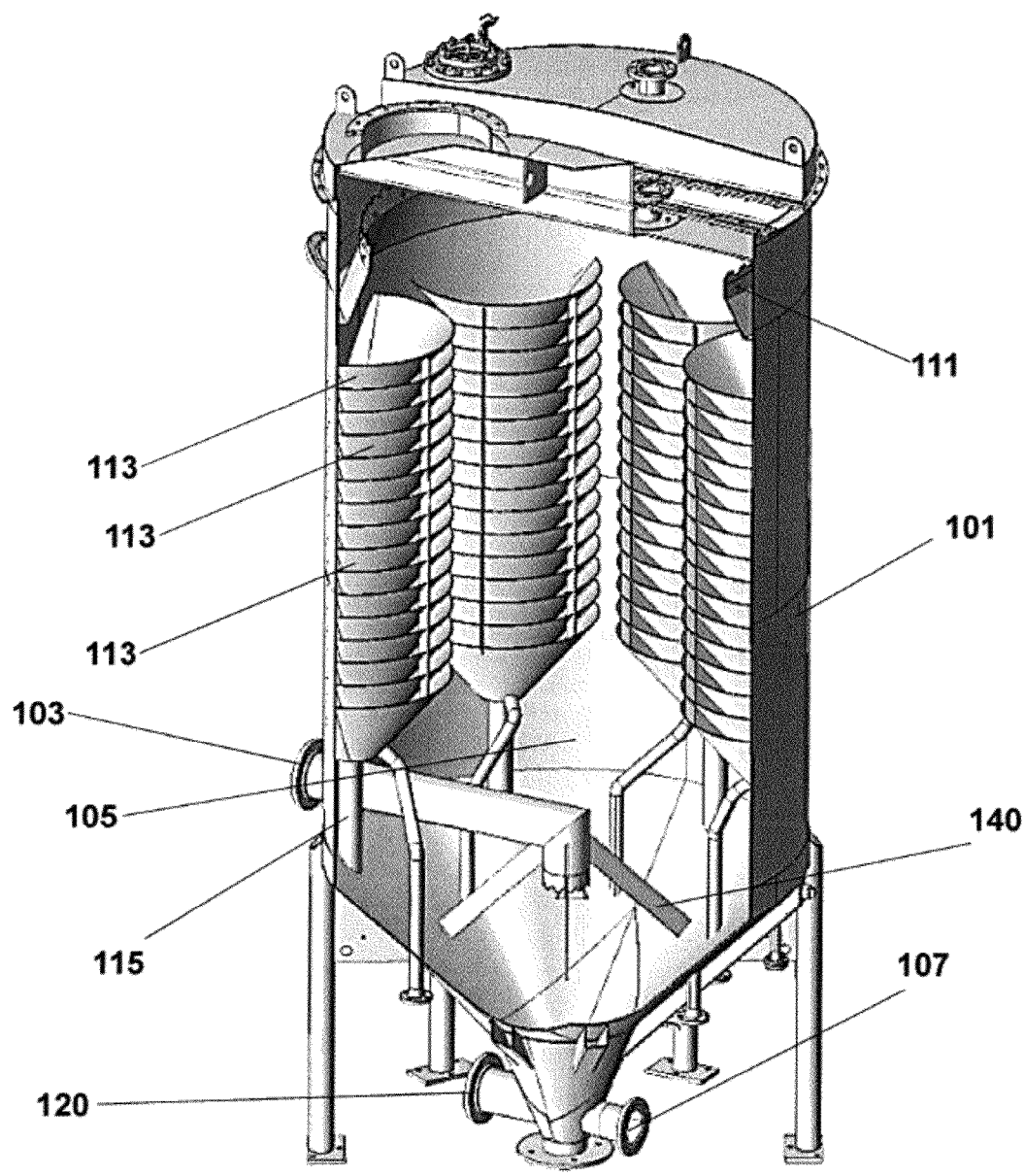
FIG. 1 is an exploded cutaway perspective view of an apparatus according to the present subject matter.

In the following description, specific details are set out to provide examples of the claimed subject matter. However, the embodiments described below are not intended to define or limit the claimed subject matter.

It will be appreciated that, for simplicity and clarity of illustration, where considered appropriate, reference numerals may be repeated among the figures to indicate corresponding or analogous elements or steps. Numerous specific details are set forth in order to provide a thorough understanding of the exemplary embodiments of the subject matter described herein. However, it will be understood by those of ordinary skill in the art that the embodiments described herein may be practiced without these specific details. In other instances, well-known methods, procedures and components have not been described in detail so as not to obscure the present subject matter. Furthermore, this description is not to be considered as limiting the scope of the subject matter in any way but rather as illustrating the various embodiments.

Figure 2:
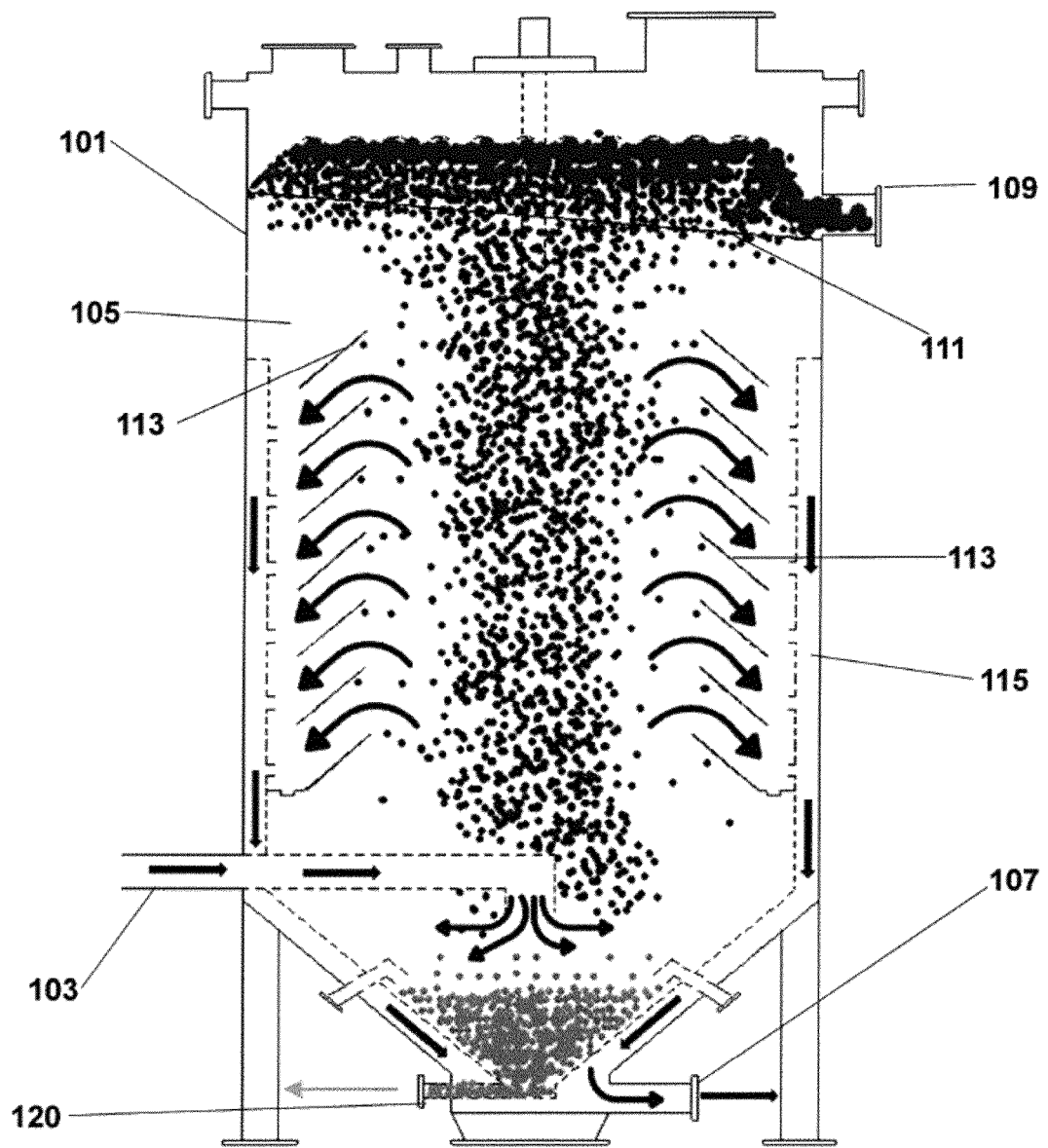
FIG. 2 is a schematic cross-section of the apparatus of FIG. 1.

One embodiment of an apparatus for the gravitational separation of a first and second liquid phases of a two phase liquid is shown in FIGS. 1 and 2. The two phase liquid may contain predominantly a continuous first liquid phase with a dispersed second liquid phase. The second liquid may have a lower specific gravity than the first liquid. The first liquid may be substantially water and the second liquid may be substantially oil.

The two phase liquid may be a waste water effluent. For example, the two phase liquid may be a waste water effluent from an oil refinery, petro-chemical plant, chemical plant, or natural gas processing plant.

The two phase liquid may contain oil. The oil may be in a variety of forms, such as free, emulsified and dissolved. Free oil may be in the form of discrete oil globules of a size sufficient so that the globules can rise as a result of gravitational force and form an oil layer on top of the water. Under proper conditions, free oil may thus be separated from the water phase by gravity.

The two phase liquid may also contain dispersed solids. Solids inside the two phase liquid with a specific gravity greater than 1.0 will settle to the bottom.

As shown in FIGS. 1 and 2, the apparatus comprises a tank 101. The two phase liquid to be treated is fed to the tank 101 through a feed inlet 103. The tank is generally upright, its height being greater than its span. The tank 101 may be made of stainless steel, or coated carbon steel, or other suitable material. The tank 101 may have a generally circular cross-section to occupy less area for a given tank volume, and to provide structural integrity and ease of manufacture. The tank diameter may be between 4 to 20 feet. The tank may also have the cross section of a polygon, such as a quadrilateral, a pentagon, an hexagon, an heptagon or an octagon.

The tank 101 defines an interior chamber 105 with an upper portion and a lower portion. The upper part of the tank 101 may generally be cylindrical. The lower portion of the tank 101 may be generally conical.

The feed inlet 103 introduces the two phase liquid into the lower portion of the chamber 105. (The tank 101 may comprise one or more feed inlets to introduce the two phase liquid into the chamber 105.) The feed inlet 103 includes an elbow 140 that directs the two phase liquid downwardly into the lower portion of the chamber. The flow of the two phase liquid passing through the feed inlet 103 may range between 20 to 3000 U.S. gallons per minute (usgpm).

The tank 101 comprises a first liquid outlet 107 in the lower portion of the chamber by which separated first liquid is removed from the tank 101. The tank 101 also comprises a second liquid outlet 109 in the upper portion of the chamber by which separated second liquid is removed from the tank 101.

The upper portion of the chamber has an upward flow zone through which the two phase liquid from the feed inlet rises, with the dispersed second liquid rising more than the first liquid and being separated therefrom due to the second liquid's lower specific gravity. The second liquid thus forms a floating layer above the remaining liquid with an interface therebetween that is lower than the second liquid outlet 109.

No mechanical system is used to recover the second liquid. The second liquid is recovered by spilling over an overflow weir. To maintain a steady state, a sensor system monitors the interface between the floating layer and the remaining liquid so that the second liquid spills over the overflow weir.

By monitoring the interface between the floating layer and the remaining liquid, the sensor system keeps the interface between the floating layer and the remaining liquid at a substantially constant level. The sensor system is further connected to a control system which is linked to a valve of the first liquid outlet 107. The control system may open or close the valve of the first liquid outlet 107 to maintain the floating layer interface at a desired level.

The control system can maintain the floating layer—remaining liquid interface at a constant height. Thus, as incoming separated second phase liquid rises, the floating layer thickness causes the floating layer to spill over the weir. Because the interface height is controlled, the floating layer thickness is also controlled.

The height of the overflow weir may be adjustable. The second liquid spills over the overflow weir and can be recovered by a conduit 111. The conduit 111 may direct separated second liquid from the floating layer to the second liquid outlet 109. The conduit 111 may be a generally ring-like trough having a sloped bottom to direct the second liquid to the second liquid outlet.

The conduit 111 may comprise a barrier that permits separated second liquid to flow into the conduit 111 only when the top of the floating layer reaches a predetermined height. The bottom of the conduit 111 may be sloped to facilitate the flow of the second liquid to the second liquid outlet 109.

The upward flow zone may be in the center of the upper portion of the chamber 105. The upward flow zone may further be in any defined region of the upper portion of the chamber 105.

The upper portion of the chamber may also have an array of baffles 113 contiguous to the upward flow zone. The baffles 113 may generally be funnel-shaped. The chamber 105 may comprise six to eight stacks of generally funnel-shaped baffles. The baffles 113 may be arranged in stacks around the upward flow zone. The baffles 113 may define channels through which separated first liquid descends. The channels may be directed downwardly away from the upward flow zone.

The baffles 113 may be arranged to add separation surface to help the separation of the first and second liquid phases of the two phase liquid. In particular, the baffles may be arranged to be upwardly inclined in relation to the tank to define one or more upwardly inclined channels through which the separated first liquid descends. Such configuration of the upward flow zone increases the separation process and reduces the flow to surface ratio, also called the overflow rate, within the tank, thereby promoting separation of the first liquid from the two phase liquid.

Passages 115 isolated from the chamber 105 communicate with the channels and carry separated first liquid to the first liquid outlet 107.

As noted above, a valve controls the flow of separated first liquid from the first liquid outlet 107 to maintain the height of the interface between the floating layer and the remaining liquid at the desired level. A transmitter transmits control signal information from the sensor system to the valve.

The sensor system may use pulses of electromagnetic energy transmitted down a probe to measure the location of the interface between the floating layer and the remaining liquid inside the chamber. When a pulse reaches a surface or liquid that has a higher dielectric than the air or liquid in which it is traveling, the pulse is reflected. An ultra high-speed circuit in the sensor system measures the transmit time of the reflection and the accurate level of the reflection, which may be relative to the length of the probe.

As noted above, the sensor system may comprise transmitters capable of measuring both an upper liquid level, a lower liquid level and an interface between the upper and lower liquid. For example, the upper liquid may have a dielectric constant between 1.4 and 5, and the lower liquid may have a dielectric constant greater than 15. In the case of an oil layer over water, the upper layer of oil may be non-conductive with a dielectric constant of around 2, and the lower layer of water may be very conductive, with a dielectric constant of around 80.

In one embodiment, the sensor system may utilize pulses of electromagnetic energy transmitted down a waveguide. For example, the waveguide may be immersed into fluids inside the chamber. The waveguide may be placed on the top of the chamber when immersed into fluids. The waveguide may also be placed into direct contact with the wall of the tank. In another embodiment, the waveguide may be placed on the overflow weir or the conduit. When a pulse reaches a liquid surface that has a higher dielectric constant than the air or liquid in which it is traveling, the pulse is reflected and the sensor system provides an accurate measure of the liquid level. Even after the pulse may be reflected from the floating layer, some of the energy continues down the length of the waveguide through the lower liquid. The pulse may again be reflected when it reaches the higher dielectric lower liquid.

For example, when a pulse reaches the floating layer, a first reflection is detected in the waveguide. As the energy continues down the length of the waveguide, a second reflection is detected as the pulse reaches the interface between the floating layer and the lower liquid.

The time difference between the first and second reflections, along with the upper layer dielectric constant and the thickness of the upper layer may be determined by the sensor system. The sensor system may thus determine the height of the interface as a function of the time difference between the first and second reflections.

As noted above, the sensor system may be used for determining the height of the interface between the floating layer and the remaining liquid inside the chamber 105. The sensor system may also determine the height of the floating layer inside the chamber 105. For example, the sensor system may comprise a guided wave radar system. For example, the guided wave radar system may be the Enhanced Eclipse® Model 705. The guided wave radar system may comprise waveguide probes. The probes may be immersed in liquids inside the chamber 105 and may transmit high frequency electromagnetic pulses. The pulses may be reflected at the interface between the floating layer and the remaining liquid. Those reflections may be measured by circuitry in the transmitters of the guided wave radar system, thus establishing the interface level measurement.

In one embodiment, when implementing the interface level measurement, a first reflection may be generated by the floating layer. The first reflection may be located at a first position along the length of the waveguide probe. The first reflection may happen at the point where the waveguide probe first comes into contact with the floating layer. For example, the first position may correspond to the height of the floating layer. A second reflection may be generated at the point where the waveguide probe comes into contact with the remaining liquid. The second reflection may be located at a second position along the length of the waveguide probe. The guided wave radar system may determine the interface level by analyzing the first and second reflection. The guided wave radar system may determine the height of the floating layer by analyzing the first reflection. The guided wave radar system may also determine the range of the floating layer along the waveguide probe by analyzing the first and second reflection. The interface level may correspond to a position along the length of the waveguide probe.

For example, the second position may be the location of the interface between the floating layer and the remaining layer relative to the waveguide probe. For example, the second position may be the interface level relative the waveguide probe. By determining the position of the interface level relative to the waveguide probe, the sensor system may determine the height of the interface relative to the waveguide probe. The sensor system may also determine the height of the interface relative to the height of the height of the chamber.

The sensor system may also include float control switches. The float control switches may detect the height of the floating layer within the tank. The float control switch may be a vertical reed switch. For example, the float control switch may comprise a float encircling a stationary stem, equipped with magnets. As the float rises or lowers with the height of the floating layer, the magnetic field generated from within the float actuates a magnetic reed switch mounted within the stem. When activated, the magnetic reed switch may send an electrical signal to the control system, indicating the height of the floating layer. The sensor system may be connected to a control system. The control system may monitor the interface level inside the chamber. The control system may monitor the height of the floating layer inside the chamber. For example, the control system may monitor the height of the floating layer by reading the float control switch signal. The control system may monitor the interface level inside the chamber relative to the height of the chamber. The control system may monitor the interface level relative to the waveguide probe. The control system may monitor the interface level relative to the second outlet. The control system may monitor the interface level relative to the overflow weir. The control system may monitor the interface level relative to the conduit.

The control system may monitor the height of the floating layer inside the chamber. The height of the floating layer may vary due to fluctuations in feed rate from the feed inlet. The height of the floating layer may also vary due to fluctuations in oil concentration of in the two phase liquid. The height of the floating layer may also vary due to fluctuations in temperature inside the tank.

The control system may monitor the height of the floating layer relative to the height of the chamber. The control system may monitor the height of the floating layer relative to the waveguide probe. The control system may monitor the height of the floating layer relative to the second outlet. The control system may monitor the height of the floating layer relative to the overflow weir. The control system may monitor the height of the floating layer relative to the conduit.

The control system may determine the range of the floating layer relative to the waveguide probe. The control system may determine the range of the floating layer relative to the height of the chamber. The control system may determine the range of the floating layer relative to the waveguide probe. The control system may determine the range of the floating layer relative to the second outlet. The control system may determine the range of the floating layer relative to the overflow weir. The control system may determine the range of the floating layer relative to the conduit.

The control system may comprise one or more controllers. The controllers may include Proportional-Integral-Derivative (PID) controllers. For example, the control system may be connected to a controller, which may be linked for example to a valve of the first liquid outlet 107. The control system may open or close the first liquid outlet 107 to maintain the interface at the desired level. The control system may open or close the first liquid outlet 107 to maintain the floating layer at a desired height.

As the valve may be used for controlling the flow of the separated first liquid from the first liquid outlet, the valve may be responsive to the control system such that the height of the floating layer may be held at the desired level. For example, the desired level may be a level relative to the overflow weir or conduit. The control system may maintain the height of the interface level such that the second liquid from the floating layer overflows to the weir or conduit. The control system may maintain the height of the floating layer such that the second liquid from the floating layer overflows to the weir or conduit.

In another embodiment, the valve may be responsive to the control system such that the interface between the floating layer and the remaining liquid is kept at a desired range. For example, the desired range may be a range relative to the overflow weir or conduit. The control system may maintain the range of the floating layer such that the second liquid from the floating layer overflows to the weir or conduit. The tank may also comprise a sludge outlet 120 in the lower portion of the chamber by which sludge can be removed from the tank. As the feed inlet is oriented face down inside the chamber 105, any solids contained in the two phase liquid will accumulate at the bottom of the tank and form the sludge. A sludge hopper may be located at the bottom of the tank and provides for adequate settling of any solids.

No moving parts are required inside the chamber to drain or to avoid sludge settling in the tank chamber 105. Pressurized water or steam nozzles may be used for flushing and evacuating the sludge. The tank may comprise one or more inlets by means of which steam or high pressure water can be injected to fluidize the sludge.

The tank may further comprise a nitrogen inlet and a nitrogen outlet by which a blanket of nitrogen may be maintained in the tank above the floating layer.

The tank may also comprise an inlet by which nitrogen or steam may be injected to purge the baffles.

Figure 3:
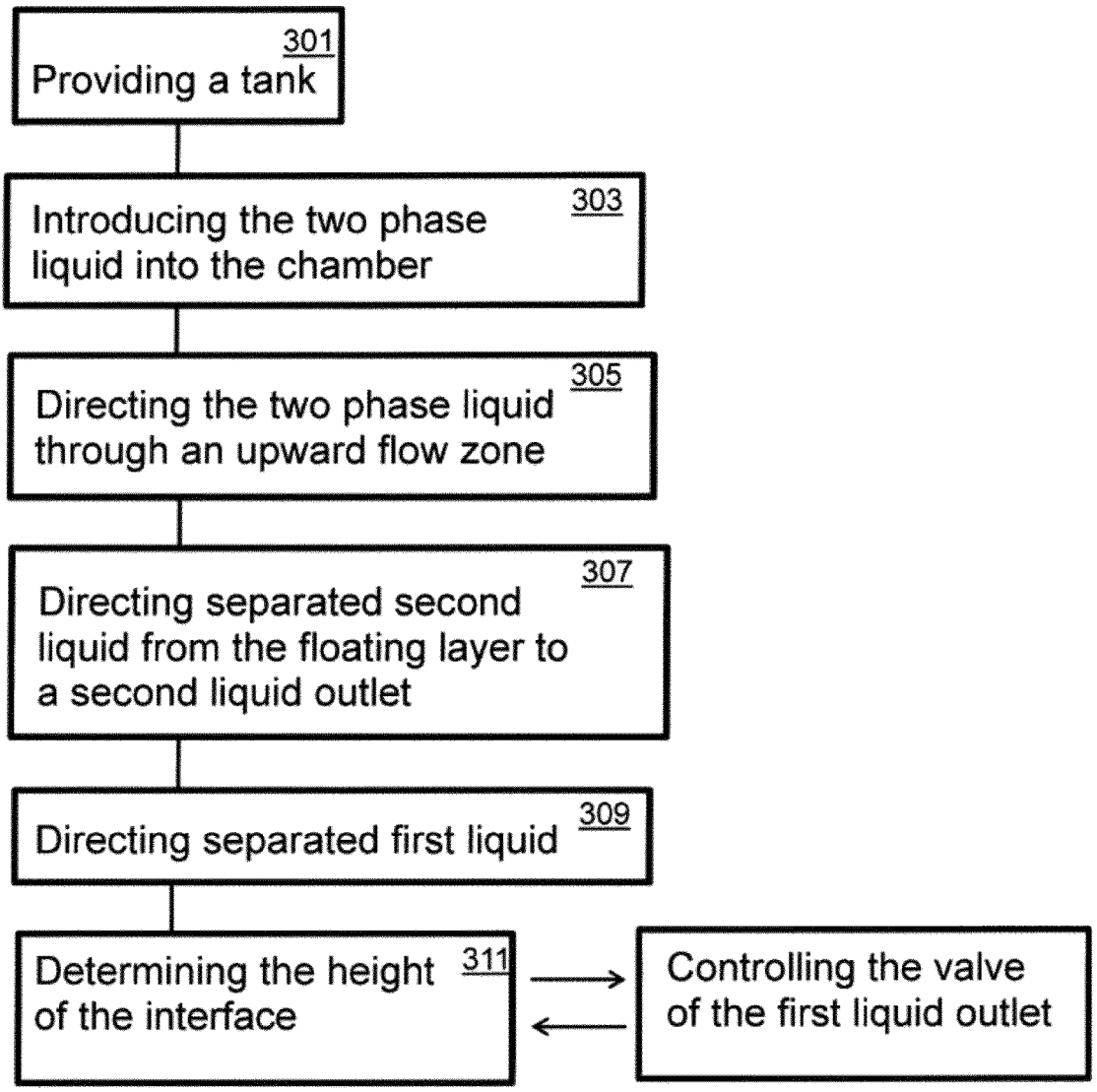
FIG. 3 is a schematic flow chart of a method according to the present subject matter.

With reference to FIG. 3 a method for the gravitational separation of the first and second liquid phases of a two phase liquid is illustrated. The two phase liquid may contain predominantly a continuous first liquid phase with a dispersed second liquid phase. The second liquid may have a lower specific gravity than the first liquid. For example, the first liquid may be substantially water and the second liquid may be substantially oil. The two phase liquid may also contain dispersed solids.

According to another example, the two phase liquid may be a waste water effluent from an oil refinery, petro-chemical plant, chemical plant, or natural gas processing plant.

At step 301, a tank defining an interior chamber with an upper portion and a lower portion is provided.

At step 303, the two phase liquid is introduced into the lower portion of the chamber by a feed inlet.

At step 305, the two phase liquid is directed generally upwardly from the feed inlet through an upward flow zone in the upper portion of the chamber such that the second liquid rises more than the first liquid and separates therefrom due to the difference between their specific gravities, and forms a floating layer above the remaining liquid with an interface therebetween.

The two phase liquid may be introduced downwardly into the lower portion of the chamber.

At step 307, the separated second liquid is directed from the floating layer to a second liquid outlet that is located in the upper portion of the chamber below the interface between the floating layer and the remaining liquid via a conduit having a barrier that permits the second liquid to flow to the second liquid outlet only when the top of the floating layer reaches a predetermined height. The separated second liquid may be directed from the floating layer to the second liquid outlet via a generally ring-like trough having a bottom sloped toward the second liquid outlet.

At step 309, the first liquid is directed downwardly through channels defined by an array of baffles contiguous to the upward flow zone, and further through passages isolated from the chamber that communicate with the channels and carry separated first liquid to a first liquid outlet located in the lower portion of the chamber. Step 309 may be concurrent to step 307.

At step 311, the height of the interface is determined between the floating layer and the remaining liquid with a sensor system, the sensor system being active to control a valve that adjusts the flow of separated first liquid through the first liquid outlet such that the height of the floating layer may be held constant. Step 311 may be concurrent to step 309.

The separated first liquid may be directed downwardly through channels defined by generally funnel-shaped baffles. The baffles may be arranged in stacks around the upward flow zone. The height of the interface between the floating layer and the remaining liquid may be determined using a sensor system that includes a guided wave radar.

Periodically, the baffles may be purged with injected nitrogen or steam.

The valve may be controlled with a transmitter for transmitting control signal information from the sensor system to the valve.

The method for the gravitational separation of the first and second liquid phases of a two phase liquid may further comprise the step of periodically removing accumulated sludge from a sludge outlet in the lower portion of the chamber. The method may also include the step of periodically fluidizing and removing sludge with steam or high pressure water.

The method may further comprise maintaining a blanket of nitrogen in the tank above the floating layer.

It will of course be appreciated by those skilled in the art that many variations of the described embodiments would be possible within the scope of the invention defined by the claims herein.

The invention claimed is:

1. An apparatus for the gravitational separation of the first and second liquid phases of a two phase liquid containing predominantly a continuous first liquid phase with a dispersed second liquid phase, the second liquid having a lower specific gravity than the first liquid, the apparatus comprising:

an upright tank defining an interior chamber with an upper portion and a lower portion;
a feed inlet by which the two phase liquid is introduced into the lower portion of the chamber;
a first liquid outlet in the lower portion of the chamber by which separated first liquid is removed from the tank;
a second liquid outlet in the upper portion of the chamber by which separated second liquid is removed from the tank;
the upper portion of the chamber having an upward flow zone through which the two phase liquid from the feed inlet rises, with the dispersed second liquid rising more than the first liquid and being separated therefrom due to the second liquid's lower specific gravity, the second liquid forming a floating layer above the remaining liquid with an interface therebetween that is lower than the second liquid outlet;
a conduit that can direct separated second liquid from the floating layer to the second liquid outlet, the conduit comprising a barrier that permits separated second liquid to flow into the conduit only when the top of the floating layer reaches a predetermined height, and a sloped bottom to direct the second liquid to the second liquid outlet;
the upper portion of the chamber also having an array of baffles contiguous to the upward flow zone, the baffles defining channels through which separated first liquid descends, the channels being directed downwardly away from the upward flow zone;
passages isolated from the chamber that communicate with the channels and carry separated first liquid to the first liquid outlet;
a valve for controlling the flow of separated first liquid from the first liquid outlet;
a sensor system for determining the height of the interface between the floating layer and the remaining liquid; and the valve being responsive to the sensor system to regulate the flow of separated first liquid from the first liquid outlet such that the height of the floating layer can be held generally constant.

2. The apparatus of claim 1, wherein the two phase liquid also contains dispersed solids, and wherein the apparatus further comprises a sludge outlet in the lower portion of the chamber by which sludge can be removed from the tank.

3. The apparatus of claim 2, further comprising an inlet by which nitrogen or steam may be injected to purge the baffles, and an inlet by means of which steam or high pressure water can be injected to fluidize the sludge.

4. The apparatus of claim 1, further comprising a nitrogen inlet and a nitrogen outlet by which a blanket of nitrogen may be maintained in the tank above the floating layer.

5. The apparatus of claim 1 wherein the upper part of the tank is generally cylindrical, the lower portion of the tank is conical, and the baffles are generally funnel-shaped.

6. The apparatus of claim 5, wherein the upward flow zone is in the center of the upper portion of the chamber, and the baffles are arranged in stacks around the upward flow zone.

7. The apparatus of claim 5, wherein there are from six to eight stacks of generally funnel-shaped baffles.

8. The apparatus of claim 7, wherein the first liquid is substantially water and the second liquid is substantially oil.

9. The apparatus of claim 1, wherein the sensor system includes a guided-wave radar.

10. The apparatus of claim 1, further comprising a transmitter for transmitting control signal information from the sensor system to the valve.

11. The apparatus of claim 1, wherein the conduit is a generally ring-like trough having a sloped bottom to direct the second liquid to the second liquid outlet.

12. The apparatus of claim 1, wherein the feed inlet directs the two phase liquid downwardly into the lower portion of the chamber.

13. A method for the gravitational separation of the first and second liquid phases of a two phase liquid containing predominantly a continuous first liquid phase with a dispersed second liquid phase, the second liquid having a lower specific gravity than the first liquid, the method comprising the steps of:

providing a tank defining an interior chamber with an upper portion and a lower portion;

introducing the two phase liquid into the lower portion of the chamber by a feed inlet;

directing the two phase liquid generally upwardly from the feed inlet through an upward flow zone in the upper portion of the chamber such that the second liquid rises more than the first liquid and separates therefrom due to the difference between their specific gravities, and forms a floating layer above the remaining liquid with an interface therebetween;

directing separated second liquid from the floating layer to a second liquid outlet that is located in the upper portion of the chamber below the interface between the floating layer and the remaining liquid via a conduit having a barrier that permits the second liquid to flow to the second liquid outlet only when the top of the floating layer reaches a predetermined height;

while concurrently directing separated first liquid downwardly through channels defined by an array of baffles contiguous to the upward flow zone, and further through passages isolated from the chamber that communicate with the channels and carry separated first liquid to a first liquid outlet located in the lower portion of the chamber;

and concurrently determining the height of the interface between the floating layer and the remaining liquid with a sensor system, the sensor system being active to control a valve that adjusts the flow of separated first liquid through the first liquid outlet such that the height of the floating layer can be held constant.

14. The method of claim 13, wherein the two phase liquid also contains dispersed solids, and further comprising the step of periodically removing accumulated sludge from a sludge outlet in the lower portion of the chamber.

15. The method of claim 13, further comprising maintaining a blanket of nitrogen in the tank above the floating layer.

16. The method of claim 13, wherein separated first liquid is directed downwardly through channels defined by generally funnel-shaped baffles that are arranged in stacks around the upward flow zone.

17. The method of claim 13, wherein the height of the interface between the floating layer and the remaining liquid is determined using a sensor system that includes a guided-wave radar.

18. The method of claim 17, wherein the valve is controlled with a transmitter for transmitting control signal information from the sensor system to the valve.

19. The method of claim 18, wherein separated second liquid is directed from the floating layer to the second liquid outlet via a generally ring-like trough having a bottom sloped toward the second liquid outlet.

20. The method of claim 19, wherein the two phase liquid is introduced downwardly into the lower portion of the chamber.

* * * * *